United States Patent [19]
Rhudy

[11] 3,824,683
[45] July 23, 1974

[54] METHOD FOR REDUCING CORONA IN A DYNAMOELECTRIC MACHINE
[75] Inventor: Ralph Gene Rhudy, Scotia, N.Y.
[73] Assignee: General Electric Company, Schenectady, N.Y.
[22] Filed: Aug. 13, 1973
[21] Appl. No.: 388,009

[52] U.S. Cl............ 29/596, 117/234, 310/45, 310/196, 310/214
[51] Int. Cl. ........................................ H02k 15/02
[58] Field of Search ......... 29/596; 117/234; 310/45, 310/196, 214, 215

[56] References Cited
UNITED STATES PATENTS
1,784,990   12/1930   Hill ................................... 310/196
2,613,238   10/1952   Wieseman ........................... 310/196
3,508,096   4/1970    Kull et al. .......................... 310/196

Primary Examiner—Charles W. Lanham
Assistant Examiner—Carl E. Hall
Attorney, Agent, or Firm—Vale P. Myles

[57]  ABSTRACT

A method of reducing corona in a dynamoelectric machine is provided wherein electrically conductive paint is applied to the sides of stator winding bars and the sides of stator slots in contact therewith while the conductor bars are operably mounted within the stator slots. In addition, electrically conductive paths are formed between pre-selected portions of the conductor bars and the magnetic stator punchings adjacent thereto by positioning bodies of electrically conductive silicone rubber between each of the selected points on the conductor bars and the adjacent stator punchings. Means are provided for efficiently positioning the bodies of silicone rubber in operating position and then curing the rubber to assure its stability.

9 Claims, 4 Drawing Figures

PATENTED JUL 23 1974    3,824,683
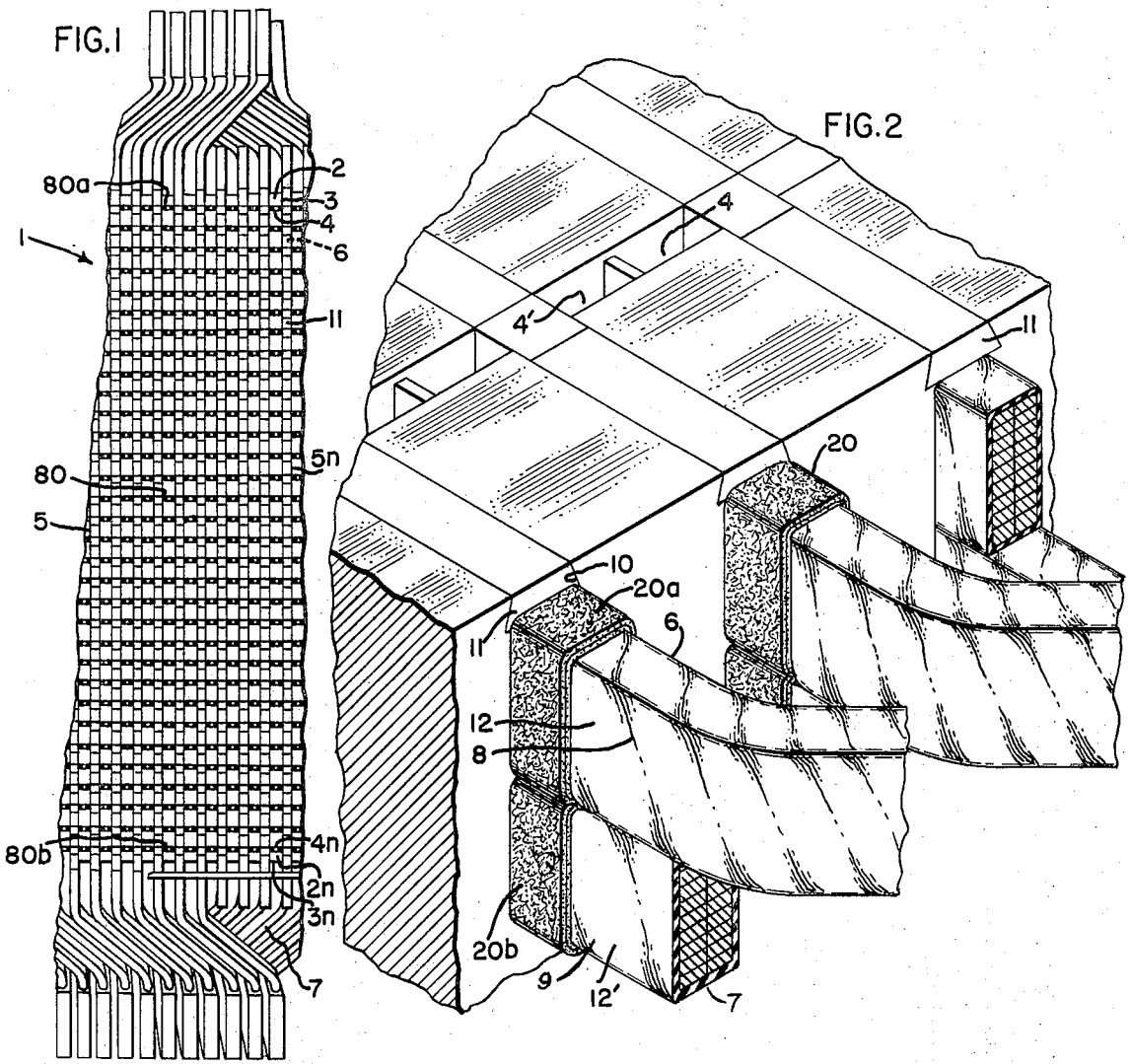
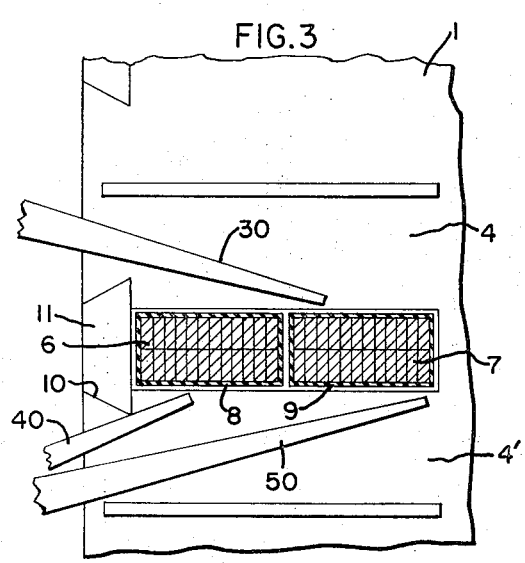
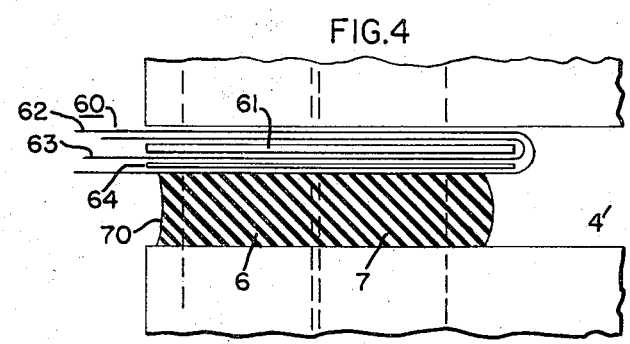

METHOD FOR REDUCING CORONA IN A DYNAMOELECTRIC MACHINE

BACKGROUND OF THE INVENTION

The present invention relates to dynamoelectric machines and more particularly, to a method for reducing corona discharges in such machines without dismantling the winding conductors thereof from the winding slots of the magnetic core of the machine.

Those familiar with the manufacture of high voltage dynamoelectric machines know that the generation of corona between the winding conductors and magnetic core elements of such machines is a common phenomena. Various manufacturing procedures have been developed in the past to eliminate the formation of corona in many types of high voltage electrical apparatus including dynamoelectric machines. One well-known technique for attaining this objective is to coat the conductor winding bars with electrically conductive paints that are effective to electrically shunt the small air space between the bars and the metal sides of the core slots, thereby to prevent a sufficient voltage from forming across these air gaps to cause the development of corona. Various embodiments of such a prior art manufacturing method are disclosed and claimed in U.S. Pat. No. 2,613,238-Wieseman, which issued on Oct. 7, 1952 and is assigned to the assignee of the present invention.

More generally, the use of electrically conductive, or semi-conductive elastomeric materials mounted in the interstics between a high voltage conductor and dielectric shield for the conductor is a well-known practice. For example, as shown in U.S. Pat. No. 2,754,487-Carr et al.; U.S. Pat. No. 3,148,011-Brown; and U.S. Pat. No. 3,344,391-Ruete, semi-conductive elastomers are frequently used in high voltage electric cable termination assemblies to avoid the formation of corona between the conductive cables being interconnected and their associated flexible dielectric cable insulation. Elastomeric materials are particularly suitable for such applications because they retain sufficient flexibility to maintain a good electrical contact with the conductor even when it is subjected to a high degree of thermal cycling.

In the prior art, several different types of devices or manufacturing methods have been developed to cope with the problem of relative movement between conductor windings and the winding slots of dynamoelectric machines, due to temperature cycling. One such method was to fill the relatively small spaces that often exist between the conductor bars and the sides of the winding slots with a thermoplastic material (typically asphalt based) that retains conformability when heated at intervals during the normal life expectancy of the machine. Thus, even though relative movement occurred between the conductor windings and the slot sides, the conformable material effectively prevented the formation of air gaps in the slots, that could lead to the development of corona. In modern day dynamoelectric machines, however, the use of such thermoplastic material in winding slots has largely been replaced by so-called hard-bar windings, the sides of which are sufficiently flat and straight to afford a generally flat electrical contact between a conductive paint on the winding and a conductive paint on the sides of the winding slots thereby to largely obviate the need for an asphalt cushion between these components. In such machines, if substantial movement is anticipated between the conductor windings and the stator slots during normal operation, a thin non-metallic, but conducting spring is sometimes inserted between the windings and one side of the stator slots to assure the maintenance of a good electrical contact between the sides of the conductor slots and the conductive coatings on the bars, even when such movement occurs. As indicated, these known methods for eliminating the formation of corona in dynamoelectric machines are generally applicable only during the initial manufacture of such machines. Once a dynamoelectric machine is completely fabricated and placed into operation, it is not possible to employ such normal manufacturing techniques to eliminate sources of corona that might be present between the windings and magnetic core components of the machine.

In the past, when areas of severe arcing or corona were detected in the slot areas of assembled dynamoelectric machines, typical repair procedures required the disassembly of the windings from the winding slots so that one or more of the above-mentioned corona elimination methods could be used to refinish the winding conductor insulation with a suitable electrically conductive paint. Obviously, it would be very desirable to avoid such expensive repair or maintenance procedures, if possible. However, before the present invention, an effective method for eliminating corona in an operably assembled dynamoelectric machine does not appear to have been developed.

OBJECTS OF THE INVENTION

It is, therefore, a primary object of the present invention to provide an effective and commercially feasible method for eliminating corona between the conductor windings and the magnetic core elements of a dynamoelectric machine.

Another object of the invention is to provide an improved method for continuously preventing the formation of corona between the conductor winding and the magnetic core elements of a high voltage dynamoelectric machine that is subjected to temperatures of at least 100° C.

A still further object of the invention is to provide a method for eliminating corona in a dynamoelectric machine without requiring the disassembly of the conductor winding and magnetic core elements of the machine.

Still another object of the invention is to provide a method for forming an electrically conductive, permanently resilient path between conductor windings and the sides of a core element stacked within a dynamoelectric machine.

Yet another object of the invention is to provide an improved method of manufacturing and mounting an electrically conductive elastomer that is appropriately stabilized by a curing operation, to form a permanently resilient conductive path between the conductor windings and the sidewalls of winding slots in an assembled dynamoelectric machine.

Additional objects and advantages of the invention will be apparent to those skilled in the art from the description of it that follows, taken in conjunction with the accompanying drawings.

SUMMARY OF THE INVENTION

In one preferred embodiment of the invention, a method of eliminating corona in a dynamoelectric machine is provided wherein electrically conductive paint is applied to both the conductor winding insulation and the sides of winding slots in a magnetic core element of the machine after these components are assembled in their operating position. Before the conductive paints are applied to the machine components, their respective surfaces are treated with a solvent and one end of the conductor slots is sealed to prevent the paint from contaminating the conductor end turns. After the paint is applied through the air ducts of the assembled machine, about 5% of these air ducts are substantially filled with an electrically conductive elastomer, thereby to form electrically conductive, flexible paths between each of the conductor bars and the magnetic core elements forming the sides of the air ducts. A uniquely formed air passageway is provided through the body of elastomer in each of the selected air ducts so that air can pass freely into contact with substantially the entire length of these bodies to facilitate curing thereof. The sealing means is removed from the face of the slot ends before the machine is placed back in service.

DESCRIPTION OF THE DRAWINGS

FIG. 1 is a fragmentary side elevation view of the inner circumferential surface of a dynamoelectric machine stator, showing some of the winding slots in the stator and a plurality of conductor windings mounted in the slots. Some of the components of the illustrated machine have been treated with the corona elimination method of the present invention and the normally visible features resulting from the practice of the invention are depicted in FIG. 1.

FIG. 2 is an enlarged, fragmentary, perspective view of the bottom end of the stator and winding assembly illustrated in FIG. 1. In this Figure, there is shown one embodiment of a partially assembled sealing means that is used in practicing the present invention.

FIG. 3 is an enlarged (using the scale of FIG. 2) top view, in cross-section, of one of the winding slots illustrated in FIGS. 1 and 2 showing details of the stator air ducts and some of the corona eliminating means of the present invention. In addition, some of the dispensing apparatus used in practicing the present invention is shown in typical operating positions with respect to the illustrated winding slots and conductor bars.

FIG. 4 is an enlarged side view, taken in cross-section through one of the air ducts illustrated in FIGS. 1-3, showing a unique spacer means that is used in practicing the subject invention to form an air passageway through a body of conductive elastomer material that is positioned in the duct pursuant to the invention.

DESCRIPTION OF A PREFERRED EMBODIMENT

The invention will be disclosed herein with respect to a stator of a vertically mounted synchronous generator. As will be clear from this disclosure, the invention is equally well suited for application with other types of dynamoelectric machines. In the interest of simplifying the explanation of the invention, only the relatively pertinent component parts of a dynamoelectric machine on which the invention is applied are illustrated herein, but it will be understood that in actual practice, the remaining conventional components of the machine, such as its rotor, associated thrust bearing and housing members, will be used to place the machine in operable form.

Referring now to FIG. 1 of the drawing, it will be seen that there is shown a fragmentary circumferential portion of a dynamoelectric machine stator 1 that is formed of a plurality of groups 2—2n of laminated magnetic punchings 3—3n (best seen in FIG. 2). As is typical in the dynamoelectric machine art, the punchings 3—3n in each of the groups of punchings 2—2n are insulated from one another with a conventional insulating varnish before they are stacked in the axially spaced-apart arrangement shown in FIG. 1 to form the stator assembly 1. When the punchings are stacked in this arrangement, they define a plurality of air ducts 4—4n between the adjacent punching groups 2—2n. The configuration of the magnetic punching is such that a plurality of winding slots 5—5n are formed, respectively, in axial alignment, along the inner surface of stator 1, between the rows of air ducts. Two laminated, insulated, generally rectangular in cross-section conductor bars 6 and 7 are mounted in stacked relationship to one another in each of the slots 5—5n. The lower end turn portions of these pairs of such bars (6 and 7) are shown in detail in FIG. 2 and will be referred to hereinafter in connection with a further description of the invention. The particular electrical connection arrangement of the conductors 6 and 7 and the remaining conductor bars in the stator 1 is not important to an understanding of the present invention, therefore, it need only be appreciated that any conventional winding circuit arrangement may be utilized with the invention disclosed herein to connect the conductor bars into a suitable coil pattern. Moreover, the number of conductor bars mounted in a given stator slot is not particularly critical in practicing the invention, as will be better understood when the invention is more fully explained hereinafter.

Each of the pairs of conductor bars 6 and 7 is held within a respective stator slot 10 by a conventionally formed slot wedge 11. Of course, similar slot wedges will be used in the remaining winding slots 5—5n of stator 1 to lock all of the conductor bars in operating position. As is customary in the manufacture of high voltage dynamoelectric machines, the conductor bars 6 and 7, and all of the other conductor bars in the machine, are lap wound with conventionally impregnated insulating tape, such as the tapes 8 and 9, respectively, (see FIG. 2). The outer surfaces of these tapes are normally coated with a semi-conducting paint 12 and 12', or other suitable coating material, before the conductor bars are placed in the stator slots (10). Also, as explained at the outset above, the walls of each of the slots (10) are usually coated with a similar semi-conducting electrical paint (not shown) before the conductor bars are mounted therein. The use of such semi-conducting paints and varnishes in this kind of application is fully explained in the above-noted U.S. Pat. No. 2,613,238; accordingly, a further description of this feature of the stator 1 is not believed to be necessary for an understanding of the present invention.

The invention disclosed herein comprises a method for reducing corona in a dynamoelectric machine having a core member such as the stator 1. Reference will now be made to FIG. 3 of the drawing to explain the details of the invention. For this purpose, it will be assumed that the stator 1 has been placed in operating condition and is then found to be generating an undesirable amount of corona discharge between the conductor bars 6 and 7 and the sidewalls of conductor slot 10, thus, a description of the method of the invention disclosed herein will be given as the method would be practiced to reduce the amount of such corona.

Pursuant to the invention, the stator 1 is disposed so that the winding slots 5—5n are in a generally upright position as shown in FIG. 1. Of course, for a vertical synchronous generator of the type disclosed herein the stator 1 would normally be in a vertical position in its operating condition, thus, it would only be necessary to remove the rotor from the machine, or perhaps just a few poles from the rotor, in order to gain access to the inner ends of the air ducts 4—4n for the purposes to be explained hereinafter. On the other hand, if the invention is to be practiced with respect to a horizontally mounted dynamoelectric machine, it will be appreciated that the core member should be mounted in a generally upright position as a first step in the disclosed method.

Next, in order to properly prepare the surfaces of the insulating coatings 8 and 9, respectively on conductor bars 6 and 7, as well as the sidewalls of the winding slot 10, so that these components can be uniformly coated with a conducting paint, according to the invention, a sealing means 20 (see FIG. 2) is applied around the ends of the conductor bars 6 and 7 at the junction of the bars with the bottom end of the slot 10 thereby to effectively seal the bottom end of this slot (and the remaining slots). In this embodiment of the invention, the sealing means 20 comprises two strips 20a and 20b of absorbent felt material that are inserted between the conductor bars 6 and 7 and wound, respectively, around them. The purpose of the strips of felt 20a and 20b is to prevent electrically conductive paint from running down the winding slot 10 onto the end turn portions of the bars 6 and 7. Accordingly, in practicing the invention, the strips of felt 20a and 20b are double looped around the conductor bars 6 and 7, respectively, and forced against the bottom end of the stator 1 adjacent the slot 10, to effectively seal the slot. A wide range of suitable materials may be used to form the strips 20a and 20b, but in the preferred embodiment they are formed of the type of felt commonly used to form coil end turn spacing blocks in modern electric motors and generators. It has also been found that preformed blocks or rolls of absorbent cotton can be used in lieu of the strips 20a and 20b to prevent solvent and paint from contacting the surfaces of the end coil. In applying such an alternative, the rolls of cotton are forced between the sides of the conductor bars and normally present stator lamination supportive structure (not illustrated in the drawings) to hold the cotton firmly against the small gaps between the bars and between the slot walls and the bars.

It should be appreciated that normally the existence of a high level of corona discharge in a dynamoelectric machine will be due to the deterioration of the coatings of semi-conducting paint (12 and 12') on the conductor bars. Therefore, in practicing the invention to reduce the generation of corona in the stator 1, normally, all of the winding slots and conductor bars will be treated in substantially the same manner as the slot 10 and conductor bars 6 and 7 to which particular reference is made herein in describing the steps of the invention. Consequently, as already noted, repeated reference will not be made during the course of the following description to the substantially indentical repetitive component parts of the stator.

After the bottom ends of all of the winding slots (10) have been sealed with the sealing means 20, a suitable solvent dispenser 30, only the nozzle of which is shown in FIG. 3, is provided and is subsequently inserted between each of the groups 2—2n of magnetic punchings, into the air ducts 4—4n adjacent the conductor bars 6 and 7. Assuming that the particular air ducts shown in FIG. 3 are at the top of the stator 1, the nozzle 30 may first be positioned in the illustrated air duct 4 on the left side of the conductor bars (as seen in FIG. 1) and subsequently the nozzle 30 may be inserted in the air duct 4' on the right side of the conductor bars (as seen in FIG. 1). It has been found that optimum results are obtained in coating the sides of the conductor bars 6 and 7 and the sides of the winding slot 10 if the solvent dispenser 30 is positioned adjacent the mid-point of the conductor bar 7 so that a suitable amount (generally one squirt of approximately 1/16 fluid ounce or 2 milliliters) of a suitable selected solvent can be applied to the upright side of that bar. Subsequently, the nozzle 30 is moved to a point adjacent the middle of conductor bar 6 and a second squirt of solvent is applied to the upright side of that bar. Best results are obtained if this procedure is repeated in each of the air ducts of the stator 1, commencing in the uppermost tier thereof and proceeding around a section of the stator that is three to four feet wide, then completing the successive lower tiers of air ducts in the selected section in the same manner, before proceeding to treat the next adjacent section. This procedure is followed until the ducts around the entire circumference of the stator is treated. Of course, in small diameter machines, it may be possible to treat all of the ducts around the entire circumference of the stator in each tier, before treating successively lower tiers of ducts. The rate of drying, or evaporation of the solvent will be controlling in this regard, in each case. A suitable solvent for use in practicing the invention is Toluene, which, it has been found, is effective to cause electrically conductive paint to spread relatively smoothly over the treated surfaces of the conductor bar insulation and the sidewalls of the winding slots. Of course, other suitable solvents may be used in alternative embodiments of the invention.

Following the application of solvent to both sides of all of the conductor bars, in the manner set forth above, a suitable paint dispenser 40 is provided and is inserted between each of the group 2—2n of punchings into the air ducts in substantially the same sequence as was followed in applying the solvent. As illustrated in FIG. 3, the spout of the paint dispenser 40 is shown in air duct 4' adjacent the outer end of conductor bar 6. When positioned sequentially adjacent the respective sides of each of the conductor bars (6 and 7) one squirt (approximately 1/16 ounce) of electrically conductive paint is applied from the dispenser 40 to the upright sides of each of the bars. The type of electrically conductive paint that is dispensed from the dispenser 40 in practicing the invention may be any of the well-known electrically conductive paints commonly used in the manufacture of dynamoelectric machines. In one preferred embodiment of the invention, the type of paint disclosed in the afore-mentioned Wieseman patent is employed.

Following the sequential painting of the sides of each of the conductor bars of stator 1, the conductive paint is allowed to cure. To assure good electrical contact with the sides of the stator slots, it is preferable to clean the surfaces of the slots thoroughly. Various methods may be used to effect such cleaning. One suitable technique is to use a rotatable grinding "flapper" that comprises a flexible blade of emery paper mounted in the slot of a motor driven rotatable shaft. As the "flapper" is inserted into the ducts, care must be taken to prevent it from abrading the surface of the conductor bar insulation. By holding the rotatable shaft close to the stator, the three sides of the stator slots can be effectively cleaned in this manner without damaging the conductor insulation. Following the abrading operation, the ducts are scrubbed clean with a Toluene soaked swab. The next step in practicing the fundamental method of the invention is to insert a dispenser 50 filled with electrically conductive elastomer into certain of the air ducts 4—4n between pre-selected groups of punchings. Pursuant to the invention, the pre-selected groups of punchings comprise those at pre-selected points 80, 80a and 80b (see FIG. 1), respectively, near the centers of the conductor bars and near the respective ends thereof. Preferably, the spout of dispenser 50 is inserted to a point adjacent the innermost end of conductor bar 7 and conductive elastomer is applied from the dispenser to substantially fill the air duct 4' as the dispenser spout 50 is slowly withdrawn from the air duct, thereby to fill the air duct along its length adjacent the conductor bars 6 and 7. By following this sequence of operation in each of the air ducts at the aforementioned selected points, a plurality of electrically conductive paths are formed with each of the bodies of elastomer, respectively between each of the conductor bars and the groups of punchings immediately adjacent said selected points. The body of conductive elastomer 70, thus formed in duct 4' should be terminated at its radially innermost end adjacent the radially outermost side of slot wedge 11 so that it completely covers the sides of conductor bars 6 and 7 but does not extend undesirably close to the inner circumferential surface of the stator 1. An alternative method of filling the pre-selected ducts with bodies of conductive elastomer is to employ a metered, pressurized dispenser (not shown) that is provided with a short spout and a sealing flange that is operable to seal the mouth of each duct when the outer end of the spout is inserted therein. The meter on the dispenser is set so that a body of elastomer 70 of sufficient size to just fill the area of the ducts adjacent the bars (6 and 7) is forced into each of the ducts. The viscosity of the silicone rubber is such that the ducts are uniformly filled in this manner with no appreciable voids being formed in the rubber, or between it and the conductor bars or sides of the slots.

Various well-known electrically conductive elastomers can be dispensed from the dispenser 50 in practicing the invention; however, in the preferred form of the invention, a conductive silicone rubber is used. More specifically, it has been found that an ideally suited silicone rubber for this purpose comprises about 20 percent by weight, and up to 50 percent by weight, electrically conductive carbon and about 80 percent (up to 50 percent) by weight silicone rubber polymer. In alternative compositions, 20 percent to 50 percent by weight carbon and at least 50 percent by weight silicone rubber can be used with the remainder of the composition comprising suitable fillers. This novel composition affords rapid curing and at the same time, results in a conductive body of elastomer 70 being formed between the conductor bars and the stator punchings, which, when cured, remains stable during the normal operation of the dynamoelectric machine. More particularly, it has been found that such conductive silicone rubber does not deteriorate and lose its resiliency when subjected to temperatures well in excess of 155° C, so the conductive paths are effectively maintained, and prevent the formation of undesirably high voltages across the conductive paints that were applied, in the earlier steps of the method of the invention, to eliminate corona sources existing in the machine. Finally, in practicing the fundamental method of the invention, the sealing means 20 is removed from the lower ends of the conductor bars (6 and 7), before the stator is again placed in operation.

Although the foregoing description of the fundamental steps of the method of the invention discloses a novel and operable way to eliminate corona from a dynamoelectric machine, I have developed several refinements of the invention that I have found preferable for use in correcting such corona conditions in relatively large stators that are subjected to severe thermal cycling. These improved refinements provide a better cure for the bodies of conductive elastomer, and provide a more efficient means for attaining such cures. In this regard, although the above-described silicone rubber will cure to a usable degree for some applications of the invention, when each of the air ducts 4—4n are completely filled with the rubber in the manner explained above, I have found that in practicing the invention on large machines, it is desirable to provide an air passageway through each of the bodies of elastomer 70 to assure their more complete and relatively more rapid cure. Several forms of these improved refinements of the present invention will now be described in detail.

In general, the steps of the method of the invention outlined above are used in combination with the steps that will now be described in order to practice this more preferred method of the invention. Accordingly, after the first four steps of the above-described method are carried out so that a cured coating of electrically conductive paint is in place between each of the sides of the conductor bar and the sidewalls of their associated winding slots, and before the dispenser filled with conductive elastomer is inserted into any of the air ducts, a plurality of first elongated, generally flat removable spacer members 61 (see FIG. 4) are positioned respectively between each of the conductor bars (6 and 7) and the groups 2—2n of punchings at the above-mentioned pre-selected points at which the conductive elastomer will be inserted into the air ducts of stator 1. Next, the bodies of conductive elastomer 70 are inserted as outlined above in the foregoing description of fundamental steps of the method of the invention. Finally, after the conductive elastomer bodies have cured sufficiently, the spacer members 61 are removed therefrom, so that air passageways are thereby formed through each of the electrically conductive paths of elastomer. Such passageways, of course, comprise the spaces formerly occupied by the spacer members 61.

In practicing this embodiment of the invention, various suitable members may be used. For example, the spacer member 61 may be a half-inch wide pressed fibre board, wetted with water prior to insertion into the air duct. However, in general, it was found that due to the adhesive nature of electrically conductive elastomers that will ordinarily be utilized in practicing the invention, a problem frequently arises in that the removal of a one-piece spacer member 61 tends to cause the elastomer to be loosened or completely removed from the air duct in some cases. Accordingly, a particularly preferred spacer member construction has been developed pursuant to the present invention, and the use of such a preferred spacer member is recommended, pursuant to the desirable extension of the method of the invention that will be described below. Another potential problem involved in the use of water in the ducts is that rust may form on the exposed stator laminations. Thus, the more preferred spacer members described below are more generally suitable for practicing the invention.

By utilizing this particularly preferred spacer member in practicing the most preferred embodiment of the method of the invention, it has been found that a suitable air passageway can be formed in each of the bodies of conductive elastomer without impairing the electrically conductive paths between it and the sidewalls of the air duct housing it. One form of the particularly preferred spacer member is shown in detail in FIG. 4, to which reference may now be made. FIG. 4 shows the sides of conductor bars 6 and 7 as viewed horizontally through the air duct 4'. The composite spacer member, designated generally with the reference number 60, comprises a first U-shaped strip of sheeting material 62 that is positioned around a major portion of a generally flat spacer member 61 to substantially cover the flat sides thereof. A second U-shaped strip of sheeting material 63 is positioned between the sides of the first strip of sheeting material 62 and the sides of first spacer member 61, as shown. Finally, a second elongated generally flat removable spacer member 64 is positioned between one of the sides of the first U-shaped strip of sheeting material 62 and one of the adjacent sides of the second U-shaped strip of sheeting material 63, as seen in FIG. 4. After the assembled composite spacer member 60 is positioned in air duct 4', adjacent the top thereof, the dispenser 50 of conductive elastomeric material is inserted into the duct 4' and conductive elastomer is squirted therefrom to substantially fill the portion of the air duct 4' around the composite spacer member 60, as shown by the body 70 of conductive elastomer in FIG. 4.

When the body of elastomer 70 has cured enough to form a skin on its outer surface, the second spacer member 64 is manually held in position while the ends of the second U-shaped strip of sheeting material 63 are pulled to remove the strip of sheeting material 63 and the first spacer member 61 from the body of conductive elastomer 70. By holding down (i.e., applying pressure to the right as seen in FIG. 4), the second spacer member 64, which is substantially thinner than the first spacer member 61, the first strip of sheeting material 62 is maintained in placed and there is virtually no tendency to remove the body of conductive elastomer 70 from the air duct 4'. Following the removal of first spacer member 61 and the strip of sheeting material 63, the second spacer 64 is removed from the air passageway 80 that is left in the body of elastomer 70. Finally, a sharp ended cutting tool is inserted into the passageway 80 adjacent the first strip of sheeting material to cut it at its innermost point so the side thereof immediately adjacent the stator 1 can be pulled from the passageway 80, thereby to assure a maximum exposure of air in the passageway to the body of conductive elastomer 70 to facilitate complete curing thereof.

It should be understood that a plurality of composite spacer members (not shown), similar in construction to the spacer member 60, will be used in conjunction with the bodies of elastomer inserted in the air ducts at the afore-mentioned pre-selected points on stator 1, in practicing the most preferred techniques of the method of the invention. Of course, substantially the same method of insertion and removal of each of these composite spacer members 60 may be employed. Moreover, as pointed out above, for some applications of the invention, the spacer members 60 need not be as complex as the preferred embodiment of the composite member 60 disclosed with reference to FIG. 4, but rather may comprise only the first spacer member 61 and perhaps the first U-shaped strip of sheeting material 62. I have already mentioned that it is helpful, in attaining relatively easy removal of such one-piece spacer members, to moisten them with water before they are exposed to the conductive elastomer. However, in view of the possibility of stator corrosion explained above, due to the presence of water in the air ducts, it is believed to be preferable to avoid the use of such corrosive liquids in most cases. In developing the most preferred form of the invention, it was also discovered that the first spacer member 61 and second spacer member 64 might be used in combination with the first strip of sheeting material 62, without utilizing the second strip of sheeting material 63 in applications where ease of removal of the first member 62 are not so important. In such alternate embodiments, the respective component parts of composite spacer member 60 will be used to perform substantially the same functions as those described above with reference to the embodiment illustrated in FIG. 4.

Although the air passageway 80 was described above as being positioned at the top of an air duct, it should be recognized that the passageway 80 may equally well be positioned at other locations in the body of elastomer 70. In general, though, the spacer member 60 should have a minimum amount of contact with the conductor bars (6 and 7), so that the electrical contact formed between the elastomer 70 and the bars 6 and 7 is not impaired. In this regard, it will be seen that the spacer member 60 may be arranged so that the generally flat spacer members 61 and 64 are in either a vertical or a horizontal position, or at some other convenient angle, since the particular orientation of these members does not significantly affect the manner of their use.

Two critical factors in determining the size of the passageway 80 are: (1) It should be large enough to expose a substantial length and surface area of the body of elastomer 70 to air, once the spacer member 60 is removed. (2) It should be large enough to enable the spacer member 60 to be removed easily without loosening the bond formed between the elastomer 70 and the walls of the surrounding air duct. In the preferred embodiment of the invention, the sizes of components of composite spacer member 60 are selected so that the passageway 80 in air duct 4' extends just beyond the inner edge of conductor bar 7 and such that the cross-sectional area of resultant passage 80 is approximately one-sixth the cross-sectional area of the duct 4'. More generally, I have found that if the flat spacer members 61 and 64 are each made approximately three-eighths of an inch wide and 20 to 40 mils thick, respectively, an air passageway of suitable dimensions if formed. Of course, in machines having very large air ducts, it may be desirable to use two or more spacer members in each air duct, to form a plurality of air passageways through the bodies of elastomer positioned in the ducts.

In the preferred form of the invention, the first and second generally flat spacer members 61 and 64 comprise elongated pieces of wood. Of course, other convenient, inexpensive, generally rigid material such as the smooth rod or pressed fibre board mentioned earlier may be substituted in practicing the invention. Also, although Nomex paper is used to form the strips of sheeting material 62 and 63 in the preferred embodiment, others types of sheeting material may be substituted therefor. However, it is important that, at least for the first strip of sheeting material 62, a high temperature resistant material be utilized, so that it cannot deteriorate in service at the operating normal temperature of the windings in such a manner as to be hazardous to the machine in any way. Finally, in practicing the invention, I have found that the dispensers 30 and 40 described above should most preferably have conventional piston-actuated type mechanisms, but other suitable, commercially available dispensers may be used in practicing the invention. For example, although a piston-actuated dispenser 50 was described, as noted earlier, a metered, pressurized dispenser can best be used to eject silicone rubber into the air ducts in some applications of the invention.

Those skilled in the art will recognize that various further modifications and alternative forms of the preferred method of the invention may be developed from the teaching of it presented herein. Accordingly, it is my intention to encompass within the scope of the following claims, the true spirit and limits of the invention.

I claim:
1. A method of reducing corona in a dynamoelectric machine having a core member formed of a plurality of groups of laminated magnetic punchings axially spaced-apart from each other to define air ducts between the adjacent groups, said core member being provided with winding slots, and at least two laminated, insulated, generally rectangular in cross-section conductor bars mounted in stacked relationship to one another in each of said slots, said method comprising the steps of:
1. arranging the machine to dispose said slots in a generally upright position,
2. applying a sealing means around the ends of the conductor bars in each slot at the junction of the bars with the bottom end of the slot in which they are mounted, thereby to effectively seal said bottom end of each slot,
3. inserting a solvent dispenser between each of the groups of punchings into said air ducts adjacent each of the conductor bars, and applying solvent from said dispenser to the upright sides of each of the bars,
4. inserting a paint dispenser between each of the groups of punchings into said air ducts adjacent each of the conductor bars, and applying electrically conductive paint from said paint dispenser to the upright sides of each of the bars,
4a. allowing said conductive paint to cure,
5. inserting a dispenser filled with electrically conductive elastomer into the air ducts between preselected groups of punchings at points, respectively, near the centers of the conductor bars and the respective ends thereof, and applying conductive elastomer from said dispenser to form a plurality of electrically conductive paths with said elastomer, between each of the bars, respectively, and the groups of punchings immediately adjacent each of said points,
6. removing said sealing means from the ends of the conductor bars.
2. An invention as defined in claim 1 including the following steps:
4b. positioning a plurality of first elongated, generally flat, removable spacer members respectively between each conductor bar and the groups of punchings at said preselected points, before inserting the dispenser of conductive elastomer into the air ducts at said points,
7. removing each of said first removable spacer members after the conductive elastomer is applied in said air ducts, thereby to form an air passageway through each of said electrically conductive paths of elastomer comprising, respectively, the spaces formerly occupied by said spacer members.
3. An invention as defined in claim 2 including the following step:
4c. positioning a first U-shaped strip of sheeting material around a major portion of each of said first spacer members to substantially cover the flat sides thereof, before the dispenser of conductive elastomer is inserted into the air ducts at said points.
4. An invention as defined in claim 3 including the following step:
8. removing a major part of said first strip of sheeting material from each of the air passageways after the conductive elastomer is at least partially cured.
5. An invention as defined in claim 4 including the following steps:
4d. positioning a second U-shaped strip of sheeting material between the sides of each of said first strips of sheeting material and the respective spacer members associated therewith, before the conductive elastomer is inserted into the air ducts, thereby to shield the conductive elastomer from said second strip of sheeting material with the first strips of sheeting material.
9. removing each of said second strips of sheeting material and the first spacing member associated therewith from between the sides of the respective first strips of sheeting material positioned therearound.
6. An invention as defined in claim 5 including the following steps:
4e. positioning a second elongated, generally flat, removable spacer member between one of the adjacent sides of said first and second U-shaped strips of sheeting material, before the dispenser of con- ductive elastomer is inserted into the air ducts at said points, 10. removing each of said second removable spacer members from between the sides of the first strip of sheeting material surrounding it after the second strip of sheeting material is removed from said air passageway.

7. An invention as defined in claim 6 wherein each of said second spacer members is substantially thinner in cross-section than the first spacer member positioned in the same air duct therewith, and is positioned below said first spacer member in said air duct.

8. An invention as defined in claim 7 wherein said conductive elastomer comprises at least 20 percent by weight electrically conductive carbon and at least 50 percent by weight silicone rubber, the remainder comprising filler materials.

9. The invention defined in claim 5 wherein said first and second strips of sheeting material comprise a high-temperature paper that is capable of withstanding a temperature of at least 100° C without charring, said paper being sufficiently porous to permit air and water vapor to diffuse through it into the conductive elastomer, thereby to cure the elastomer.

* * * * *